(12) United States Patent
Fleizach et al.

(10) Patent No.: US 10,367,976 B2
(45) Date of Patent: Jul. 30, 2019

(54) SINGLE IMAGE HAZE REMOVAL

(71) Applicant: SPAWAR Systems Center Pacific, San Diego, CA (US)

(72) Inventors: Gregory K. Fleizach, San Diego, CA (US); Kristofor B. Gibson, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 97 days.

(21) Appl. No.: 15/711,838

(22) Filed: Sep. 21, 2017

(65) Prior Publication Data

US 2019/0089869 A1    Mar. 21, 2019

(51) Int. Cl.
  *H04N 1/60*    (2006.01)
  *G06T 5/00*    (2006.01)

(52) U.S. Cl.
  CPC .......... *H04N 1/6086* (2013.01); *G06T 5/002* (2013.01); *H04N 1/6027* (2013.01); *G06T 5/003* (2013.01); *G06T 2207/20028* (2013.01); *G06T 2207/20172* (2013.01)

(58) Field of Classification Search
  None
  See application file for complete search history.

(56) References Cited

U.S. PATENT DOCUMENTS

| | | | |
|---|---|---|---|
| 8,290,254 B2 | 10/2012 | Kopf | |
| 8,340,461 B2 | 12/2012 | Sun | |
| 9,031,345 B2 | 5/2015 | Jin | |
| 9,197,789 B2 | 11/2015 | Mukhopadhyay | |
| 9,305,242 B2 | 4/2016 | Huang | |
| 9,361,670 B2 | 6/2016 | Huang | |
| 9,508,126 B2 * | 11/2016 | Yang | ......................... G06T 5/10 |
| 2012/0212477 A1 | 8/2012 | Grindstaff | |
| 2015/0146980 A1 * | 5/2015 | Itoh | ..................... G06K 9/4652 |
| | | | 382/167 |

(Continued)

FOREIGN PATENT DOCUMENTS

CN           103198459 A         7/2013

OTHER PUBLICATIONS

Lin et al. "A Novel Fast Dehazing Algorithm in Driver Assistance System." IEEE. 2011.

(Continued)

*Primary Examiner* — Kevin Ky
(74) *Attorney, Agent, or Firm* — Naval Information Warfare Center, Pacific; Kyle Eppele

(57) ABSTRACT

A system and method for haze removal. The method comprises the steps of receiving, at a memory, an input image having pixels. The method further comprises converting, by a processor, each pixel in each channel of the input image to floating-point values in the range of zero to one [0,1], and brightness-correcting, by the processor, the input image to prevent the de-hazed output image from becoming overly dark. The method also includes estimating, by the processor, the airlight for the brightness-corrected image, calculating a transmission map for each color or intensity channel of the image, and refining the transmission map for each said color or intensity. A reduced-haze image is thereby provided.

12 Claims, 7 Drawing Sheets

(56) References Cited

U.S. PATENT DOCUMENTS

| | | | |
|---|---|---|---|
| 2015/0243003 A1* | 8/2015 | Choi | G06T 5/003 |
| | | | 382/274 |
| 2016/0005152 A1* | 1/2016 | Yang | G06K 9/40 |
| | | | 382/275 |
| 2016/0071253 A1* | 3/2016 | Li | G06K 9/40 |
| | | | 382/260 |
| 2018/0018775 A1* | 1/2018 | Piekniewski | G06T 1/60 |
| 2018/0053288 A1* | 2/2018 | Shah | G06T 5/009 |
| 2018/0122051 A1* | 5/2018 | Li | G06T 5/40 |

OTHER PUBLICATIONS

Yeh et al. "Efficient Image/Video Dehazing through Haze Density Analysis Based on Pixel-based Dark Channel Prior." IEEE. 2012.

* cited by examiner

SINGLE IMAGE HAZE REMOVAL

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103429.

FIELD OF THE INVENTION

The present invention relates to image processing and, more particularly, to improvement of image degradation caused by haze.

BACKGROUND

Atmospheric phenomena, such as haze (including fog, smoke, smog, drizzle and other particulate matter) can degrade images and videos by obscuring objects, decreasing contrast, and decreasing color fidelity. Haze may be caused by the particles in the air or particles in the water for underwater video. These particles may attenuate the light reflected from objects in the scene of an image. These particles may also scatter ambient light (sometimes known as "airlight") toward the imaging system that takes the images/videos. The degradation of image quality makes it more difficult to identify objects and targets in the images and videos.

Prior art methods have attempted to improve image quality based on atmospheric phenomena such as haze. One such method involves a polarizing filter. This method has drawbacks in that two orthogonally polarized images must be acquired to create a single de-hazed image. Moreover, this method requires that the scene be static, thus limiting the usefulness of the method for real-time video.

Another method requires capturing multiple images with the same scene under different atmospheric conditions. However, this method is not suitable for cameras on moving platforms. Yet another method requires a reference model to estimate the amount of haze, which is used to iteratively or recursively de-haze the image. However, generating a reference model is impractical when the scene is unknown a priori, and further, iterative processing on images can be prohibitively slow.

More recently, the dark channel prior method has received much attention. This method allows single image de-hazing by estimating the transmission (depth) map of objects in the scene. The dark channel prior method de-hazes based on the principle that the amount of scattering is directly proportional to the distance of the objects from the camera. Scattering is typically not uniform across an image since objects in the image are at different distances.

Many variations of the dark channel prior method may be found in the literature. One disadvantage of these dark channel prior-type methods is that they typically require a complex and time-consuming refinement of the transmission map. This refinement typically involves soft-matting, anisotropic diffusion, or bilateral filtering, all of which are computationally intensive. Moreover, many of these methods work on stock photography, but not in practical video applications where the scene or illumination changes quickly.

Furthermore, many of the prior art methods produce images that look unnatural due to inaccurate color restoration. These images may also look unnatural because they have halos around the edges of objects. These methods can also blur the original scene, so while the haze might be reduced, the sharpness of the original image is also degraded.

There is thus a need for a system and method for haze removal and/or reduction that addresses the shortcomings of the prior art. For example, there is a need for a system and method for haze removal and/or reduction that can be used for real-time video applications where the scene or illumination changes quickly, and that is less computationally intensive.

SUMMARY

According to illustrative embodiments, a method and system for single image haze removal is provided. The method comprises receiving, at a memory device, an input image having pixels. The method also comprises converting, by a processor, each pixel in each channel of the input image to a floating-point value in the range of zero to one; and performing, by the processor, a brightness correction on the converted input image. The method further includes estimating, by the processor, the airlight for the brightness-corrected input image; and calculating, by the processor, a transmission map for one or more channels of the brightness-corrected input image. The method still further includes refining the transmission map for each said color or intensity channel, and providing, by the processor, a haze-reduced image to the memory device.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION

According to illustrative embodiments, a system and method are provided herein for removing haze from any visible spectrum image. The system and method produce a haze-reduced image from a single-image input. The present invention improves upon the dark channel prior art method to accomplish the haze removal to result in a haze-reduced image or video.

The haze removal method and system described herein could be implemented in a number of ways. For example, the haze removal method and system could be implemented as part of a suite of tools used for image enhancement. The suite of tools could include tools for contrast enhancement, color correction, blurring, brightness and a slew of other image enhancements. The haze removal method could be available to an end user through, e.g., software or an application-specific integrated circuit (ASIC) embedded in an imaging system. The haze removal method may also operate in real-time, e.g., through a graphics processing unit (GPU) of an imaging system.

Figure 1:
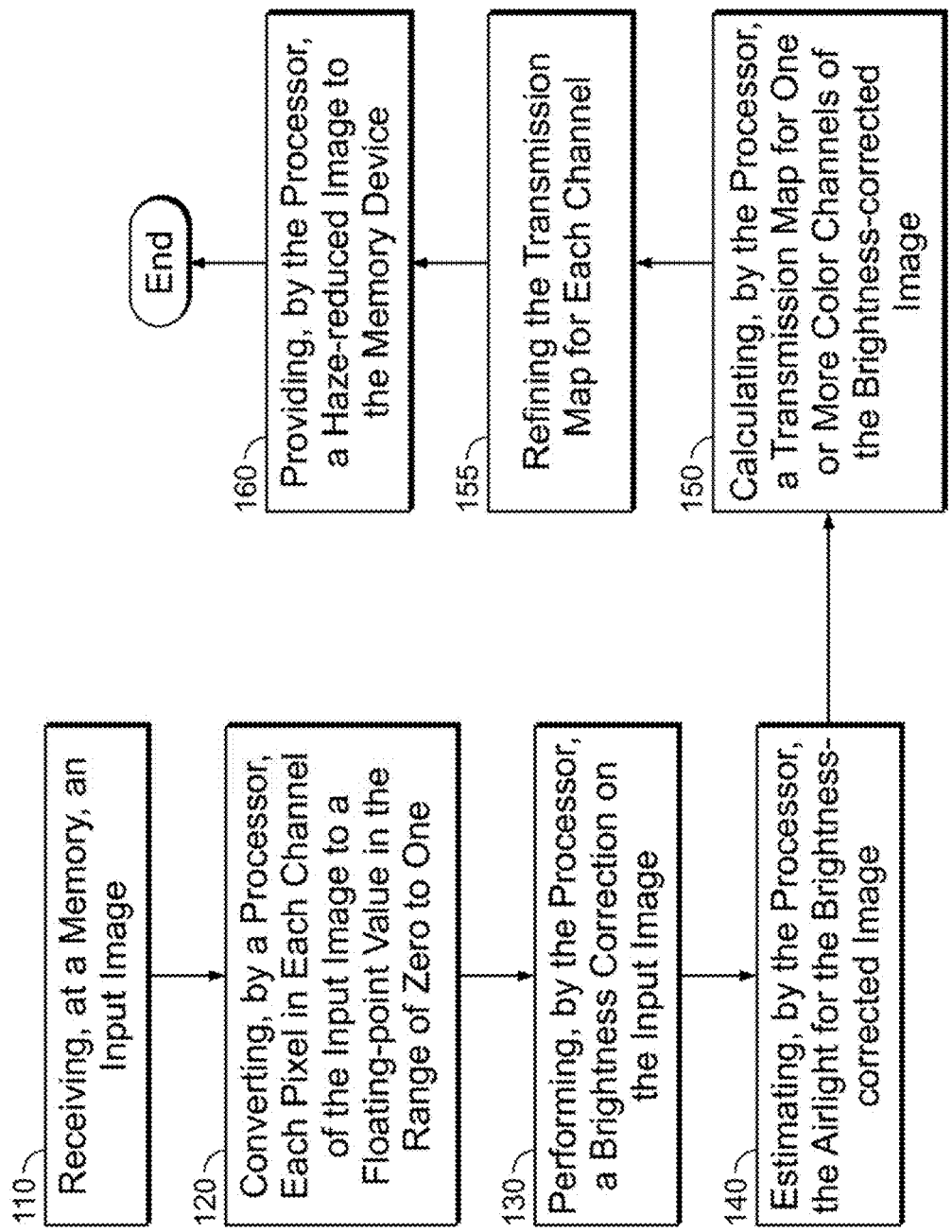
FIG. 1 is a block diagram of a method for single image haze removal in accordance with one embodiment of the present disclosure.

FIG. 1 is a block diagram of a method for single image haze removal in accordance with one embodiment of the present disclosure. At step 110, the method includes receiving, at a memory device, an input image. A single hazy digital or digitized image may be input into the memory device. The memory device may reside on—or be a part of—an electronic imaging system that also includes a processor, e.g., a digital camera. Alternatively, by way of non-limiting example, the memory device may be a part of a computer system used to post-process a hazy digital or digitized image. The present method requires no a priori information about the scenes to be captured or reference models about the haze, which means the invention is versatile. The method described herein is applicable to haze removal from images/videos taken in air-based environments and also for underwater images/videos. The input image may be a frame of a video, whether the image is taken underwater or in the air. The input image may be a color image or a monochromatic image.

At step 120, the method includes converting, by a processor, each pixel in each channel of the input image to a floating-point value in the range of zero to one, which includes fractional floating point values. The number of pixels that need to be converted may be within a broad range and vary widely, depending upon the number of pixels in the pertinent image. For example, the number of pixels may fall at the lower end of the range, e.g., for a 640×480 pixel image that has a total number of pixels of 307,200. Also by way of non-limiting example, the number of pixels in a 4K ultra high definition image may fall at the higher end of the spectrum for a total of 8.3 megapixels. For 8K ultra high definition images, the total number of pixels may be even higher, e.g., 33.2 megapixels. Other imaging systems may output images having an even greater number of pixels.

The conversion process described at step 120 is applied for each channel of the input image. It is known in the art for conversions to be performed based on values from 0 to $2^{n-1}$, and dividing by the maximum value, where the maximum value is determined by the bit depth, n. For example, if n=8, the maximum value is 255. When looking at red, green and blue color channels, respectively, the value is either 0 for the absence of the color, or 1 for the presence of said color. This algorithm can also be easily applied to monochrome images instead of color images, by simply applying the conversion process to a single intensity channel. That is, three color channels are not required.

At step 130, the method includes performing, by the processor, a brightness correction on the converted input image. The brightness correction may be, e.g., gamma correction, which is known to those of ordinary skill in the art, but it should be noted that prior art gamma correction is not necessarily used in the same context as in the present invention. One way of performing such a gamma correction may be to compute the square root of the image's pixel values in order to manipulate or modify the gamma of the image. This square root calculation is a heuristically-chosen correction that prevents the de-hazed output image from becoming overly dark. Using a gamma correction of the input image prevents the resulting de-hazed images from being overly dark, which is a common problem in de-hazing.

Figure 2:
FIG. 2 illustrates the effect of brightness correction in accordance with one embodiment of the present disclosure.

FIG. 2 illustrates the effect of the brightness correction via gamma correction in accordance with one embodiment of the present disclosure. As shown in FIG. 2, the brightness-corrected image may be notably lighter or brighter than the original image.

Referring back to FIG. 1, at step 140, the method includes estimating, by the processor, the airlight, A, of the brightness-corrected image. In this step, the method estimates the color and intensity of the haze. Next, the method will look at the depth of the scene to get a depth map, then try to reduce the haze based on the depth of the image. The airlight may be estimated at step 140 by taking the minimum value across the three color channels (e.g., red, green and blue) for each pixel of the original image I (N×M×3) and then using a minimum filter on the resulting 2D (N×M) image. The minimum filter may be, e.g., a 15×15 minimum filter. That is, each pixel is first reduced to the minimum value of the three color channels, and the result is a two-dimensional (2D) image.

The next step in estimating the airlight may involve moving a window of a predetermined size, e.g., a 15×15 pixel size, across the 2D image, pixel-by-pixel, and then replacing each pixel with the minimum value found in that 15×15 window. This is sometimes called the dark channel prior (sometimes hereinafter "DCP"). The mathematical expression is:

$$J^{dark}(x) = \min_{y \in \Omega(x)} \left( \min_{c \in \{r,g,b\}} I^c(y) \right) \quad \text{(Equation 1)}$$

where $\Omega(x)$ is a 15×15 local patch centered at x, $J^{dark}$ is the dark channel prior, y denotes the index of a pixel in $\Omega(x)$, I is the input image, and $I^c$ represents one of the red, green, or blue color channel of I. The indices of the brightest 0.1% of the DCP pixels are then determined. Using an average of the brightest 0.1% of pixels from the DCP prevents the algorithm from choosing a single errant value for the airlight estimation. This helps make the algorithm robust for a wide variety of scenes. The percentage of brightest pixels in the DCP with which to calculate the mean for the airlight estimation may be changed from 0.1%. Instead of a mean calculation on the brightest 0.1% of DCP pixels, a median or other estimate to mitigate the effects of a few bad pixels could be used. Only a single step dark channel prior estimation is required, which makes the implementation fast, unlike some other methods. The window size for the minimum filter of the DCP may be changed.

Figure 3:
FIG. 3 illustrates the DCP image from the image of FIG. 2 with the brightest of the pixels highlighted, in accordance with one embodiment of the present disclosure.

FIG. 3 illustrates the dark channel prior image from the image of FIG. 2 with the brightest 0.1% of the pixels highlighted in black at the upper left portion of the drawing. The airlight, A, is calculated as the average of the pixels in the original image at those indices. In the present example, the airlight is a red-green-blue (RGB) pixel (1×1×3).

In accordance with one embodiment of the method, a weighted average of the estimated airlight parameter from previous frames is computed to reduce flicker in videos. The expression used is as follows:

$$A = \frac{(A + 19 \cdot A_{prev})}{20} \quad \text{(Equation 2)}$$

where A is the airlight estimated for the current frame, $A_{prev}$ is the weighted airlight value that is updated each frame to the value A after the equation above. The motivation was that the airlight should not be changing quickly. Thus, the current estimate is given a small weight to reduce the flicker. The weighted average of the airlight value eliminates flicker in de-hazed/haze-reduced videos as the airlight value estimates fluctuate frame-to-frame due to a changing scene. This helps the de-hazing to be robust. A and $A_{prev}$ are RGB pixels so the weighted average is computed channel-by-channel. For the first image in a video or a single image, $A_{prev}$ is set to the current value of A and this expression has no effect.

In FIG. 1, at step 150, the method includes calculating, by the processor, a transmission map for one or more color channels of the brightness-corrected image. The transmission map is an estimate of the depth of the scene. The transmission map is computed as follows:

$$\tilde{t}^c = 1 - \frac{w \cdot I^c}{A^c} \qquad \text{(Equation 3)}$$

where w is the transmission map adjustment parameter [0, 1] that controls the amount of de-hazing, I is the original hazy image, A is the airlight, and, again, the "c" superscript denotes the operations are conducted channel-by-channel. A person of ordinary skill in the art could determine appropriate transmission map adjustment parameters. In the present example, a value of w=0.825 was used for the transmission map adjustment parameter, as it appeared to yield good results in a variety of situations. Thus, t is N×M×3, which is the same size as the original hazy image, I, and each color channel has a distinct transmission map. For example, red, green and blue color channels would have three associated transmission maps. A single value for the transmission map adjustment parameter works well across a wide range of hazy scenes and requires no manual tuning. Instead, it can simply be turned on when hazy conditions exist.

The transmission map adjustment parameter, w, the transmission map minimum, $t_0$, and the weighting on the airlight can be modified from the values explained above. These are simply examples of values that have been determined heuristically to work well for many scenes in images and video from a variety of imaging sensors.

Figure 4:
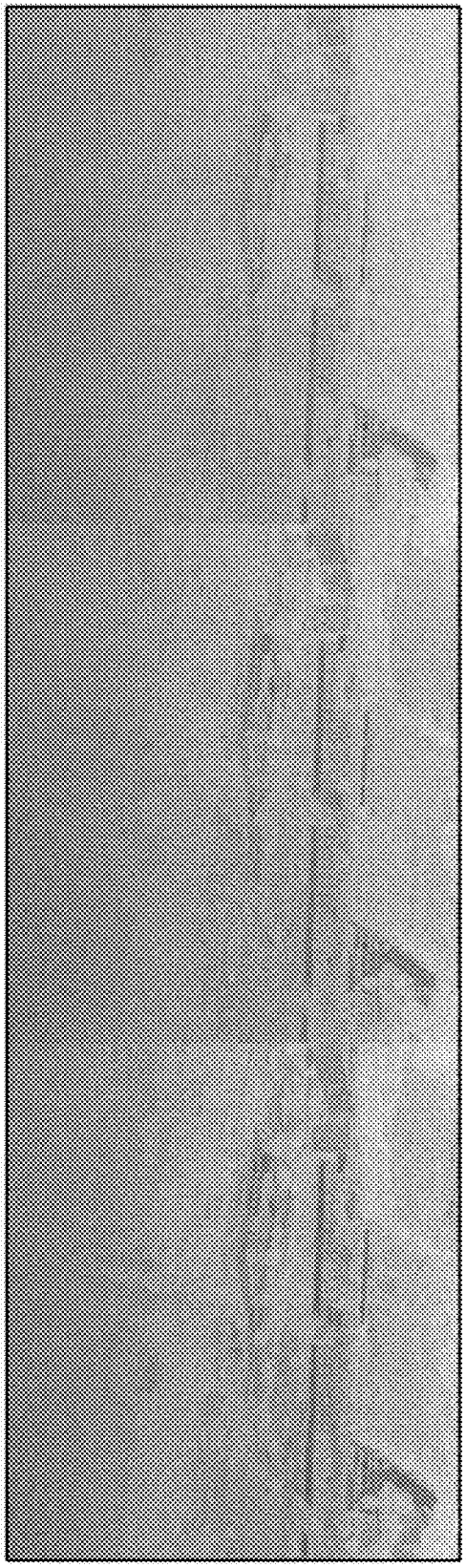
FIG. 4 displays the transmission map of each channel for the input image in FIG. 2.

FIG. 4 displays the transmission map of each channel for the brightness-corrected image in FIG. 2. A separate transmission map is estimated for each color channel, as opposed to a single transmission map for all channels. This helps to keep the image "natural-looking" and prevents halos from forming around objects.

Figure 5:
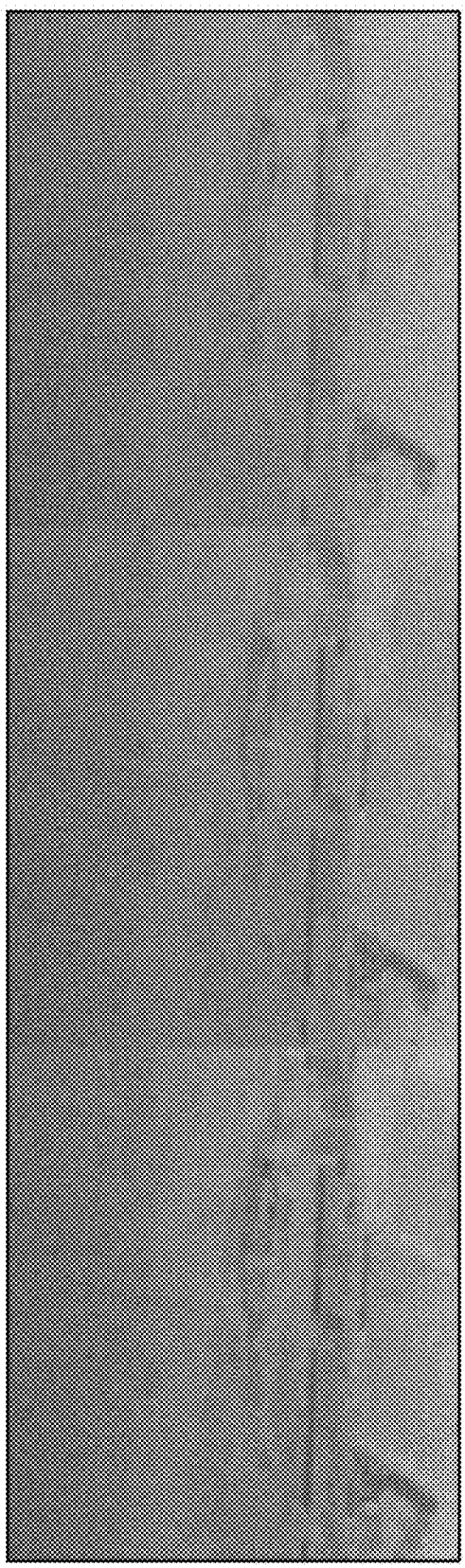
FIG. 5 shows refined transmission maps in accordance with one embodiment of the present disclosure.

Referring back to FIG. 1, the method includes, at step 155, refining the transmission map for each color or intensity channel. Here, the transmission map was refined with a simple mean filter size of 7×7 on each channel, creating t. FIG. 5 illustrates the refined transmission maps for all three color channels, which are red, green and blue. Note that the mean filtering has caused a blurring in each channel. The window size for the mean filter for the transmission map refinement may be changed, as one of ordinary skill in the art would appreciate. In the present example, the refinement of the transmission map is a simple 7×7 mean filter instead of the complicated and time-consuming refinement operations common in the literature: soft-matting, anisotropic diffusion, bilateral filtering, etc. This makes the algorithm very fast and capable of being implemented in a real-time system.

Back to FIG. 1, step 160, the method includes providing, by the processor, a haze-reduced image to the memory device. The haze-reduced image, J, is recovered with the equation:

$$J^c = \frac{I^c - A^c}{\max(t^c, t_0)} + A^c \qquad \text{(Equation 4)}$$

where t is the refined transmission map, $t_0$ is the transmission map minimum, A is the airlight, and J is the haze-free image. Again, this operation is channel-by-channel as the "c" superscript denotes. The $t_0$ transmission map minimum controls the depth to which de-hazing is performed. That is, the higher the value, the closer the depth to the camera that the de-hazing operates. A value of 0.075 was chosen since it de-hazes most of the depth of the scene and it works well across a range of scenarios. Last, the values in J are then saturated to values between and including zero and one [0,1].

Figure 6:
FIG. 6 illustrates a side-by-side comparison of the hazy input and haze-reduced output images, in accordance with one embodiment of the present disclosure.

FIG. 6 illustrates a side-by-side comparison of the hazy input and haze-reduced output images, in accordance with one embodiment of the present disclosure. As shown, the haze-reduced image is, among other things, clearer, sharper, has greater contrast and is generally a better image. No iterations or recursions on the image are necessary; only one pass through the image is required. The de-hazed or haze-reduced output image is sharper than the input image, which is in contrast to other methods that can cause blurring of the image.

Figure 7:
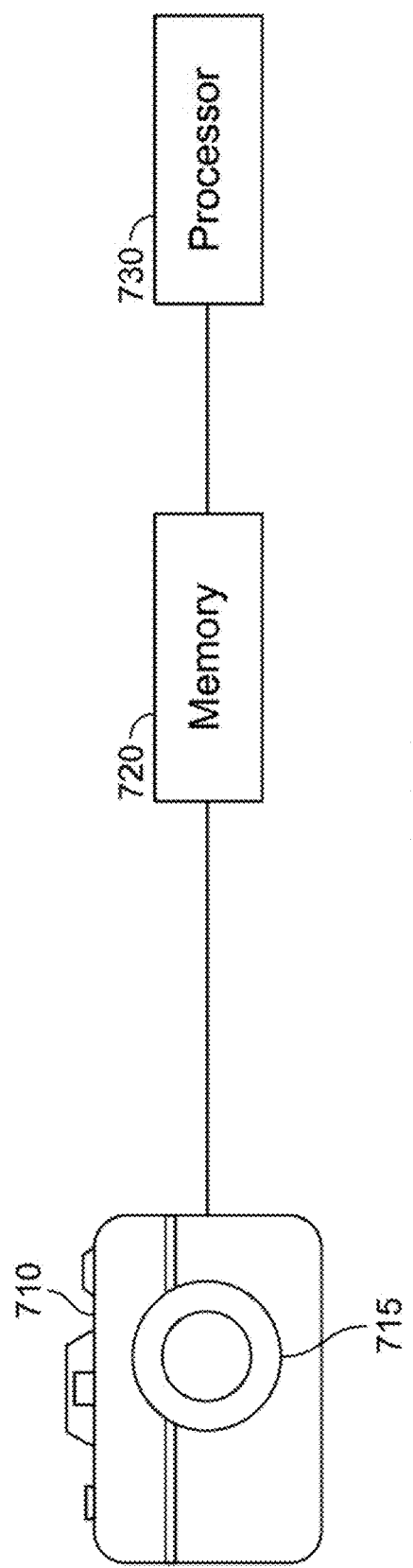
FIG. 7 illustrates a system for single image haze removal in accordance with one embodiment of the present disclosure.

FIG. 7 is a system for single image haze reduction/removal in accordance with one embodiment of the present disclosure. The system 700 may include an imaging system 710, a memory 720 that is operably coupled to the imaging system and a processor 730 that is operably coupled to the imaging system. Software (not shown in FIG. 7) may be resident in the memory 720, which may cause the processor 730 to perform one or more steps of the method for single image haze removal/reduction as set forth herein. If mechanical/electrical devices (whether existing as part of the imaging system or added thereafter) are used to further aid in this process, such devices may be located within the body of imaging system 710 or elsewhere as can be appreciated by one of ordinary skill in the art.

Memory 720, as noted hereinabove, is sufficient to hold at least the input image and output imaging of imaging system 710 that is used for the iterative process. Memory 720 may also include other elements such as processing steps or instructions related to single image haze removal. Examples of such processing steps are described in the flow chart of FIG. 1.

The speed of the processor 730 needed may depend on the application in which the processor 730 is used, as can be appreciated by one of ordinary skill in the art.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for single image haze removal, comprising the steps of:
   receiving, at a memory device, an input image having pixels, wherein the input image is a color image having three color channels;
   converting, by a processor, each pixel in each channel of the input image to a floating-point value in a range of zero to one;
   performing, by the processor, a brightness correction on the converted input image;
   estimating, by the processor, an airlight value for the brightness-corrected input image, wherein the estimating step includes the step of computing a weighted average of the estimated airlight for each color channel for frames of a video according to equation:

$$A=((A+19 \cdot A\text{prev}))/20$$

wherein A is the estimated airlight for a current frame, and Aprev is a weighted airlight value that is updated each frame to value A, and wherein the input image is a frame of the video,
   wherein the estimating step includes the step of reducing each of said pixels to a minimum value of the one or more color channels, thus resulting in a two-dimensional image, and
   wherein the estimating step further includes the steps of moving a window of a predetermined number of pixels across the 2D image pixel-by-pixel; and replacing each pixel with the minimum value found in said window of a predetermined number of pixels;
   calculating, by the processor, a transmission map for one or more color channels of the brightness-corrected input image;
   refining the transmission map for each said one or more color channels; and
   providing, by the processor, a haze-reduced image to the memory device.

2. The method of claim 1, wherein the step of calculating the transmission map is performed according to equation:

$$\tilde{t}^c = 1 - \frac{w \cdot I^c}{A^c}$$

wherein w is a transmission map adjustment parameter that controls an amount of haze reduction, I is the brightness-corrected input image, A is the estimated airlight, and superscript c denotes the transmission map calculations are conducted channel-by-channel.

3. The method of claim 1, wherein the input image is an underwater image.

4. The method of claim 1, wherein the input image is an air-based image.

5. The method of claim 1, wherein the step of providing, by the processor, a haze-reduced image, is performed according to equation:

$$J^c = \frac{I^c - A^c}{\max(t^c, t_0)} + A^c$$

wherein J is the haze-reduced image, I is the brightness-corrected input image, A is the estimated airlight, t is a refined transmission map, $t_0$ is a transmission map minimum and superscript c denotes the transmission map calculations are conducted channel-by-channel.

6. The method of claim 1, wherein the processor is a graphics processing unit.

7. A system for single image haze reduction, comprising:
   a memory configured to receive an input image having pixels;
   a processor operable to:
   convert each of said pixels in each channel of the input image to a
   floating-point value in a range of zero to one;
   perform a brightness correction on the converted input image;
   estimate the airlight for the brightness-corrected input image, wherein the processor is further operable to compute a weighted average of the estimated airlight value for one or more frames of a video according to the following equation:

$$A=((A+19 \cdot A\text{prev}))/20$$

wherein A is the estimated airlight for a current frame, and A prev is a weighted airlight value that is updated each frame to value A, and
   wherein the input image is a frame of the video, and wherein the processor is further operable to estimate the airlight for the brightness-corrected input image by:
   reducing each of said pixels to a minimum value of the one or more color channels, thus resulting in a two-dimensional image;
   moving a window of a predetermined number of pixels across the two-dimensional image pixel-by-pixel; and
   replacing each pixel with the minimum value of the one or more color channels found in said window of a number of pixels;
   calculate a transmission map for one or more color channels of the brightness-corrected input image;
   refine the transmission map for each said one or more color channels, wherein the processor is further operable to refine the transmission map for each said one or more color channels using a mean filter;
   provide a haze-reduced image at the memory device, wherein the memory device is further configured to receive the haze-reduced image.

8. The system of claim 7, wherein the processor is further operable to calculate the transmission map according to the following equation:

$$\tilde{t}^c = 1 - \frac{w \cdot I^c}{A^c}$$

wherein w is a transmission map adjustment parameter that controls an amount of haze reduction, I is the brightness-corrected input image, A is the airlight, and the superscript c denotes the operations are conducted channel-by-channel.

9. The system of claim 7, wherein the input image was taken underwater.

10. The system of claim 7, wherein the input image was taken in air.

11. The system of claim 7, wherein the processor is further operable to provide a haze-reduced image according to the following equation:

$$J^c = \frac{I^c - A^c}{\max(t^c, t_0)} + A^c$$

wherein J is the haze-reduced image, I is the input image, A is the estimated airlight, t is a refined transmission map, $t_0$ is a transmission map minimum and superscript c denotes the transmission map calculations are conducted channel-by-channel.

12. A method for single image haze removal, comprising the steps of:

receiving, at a memory device, an underwater or air-based input image having pixels, wherein the input image is monochromatic or color;

converting, by a processor, each pixel in each channel of the input image to a floating-point value in a range of zero to one;

performing, by the processor, a brightness correction on the converted input image;

estimating, by the processor, the airlight for the brightness-corrected input image, wherein the estimating step includes the step of computing a weighted average of the estimated airlight for frames of a video according to equation:

$A = ((A + 19 \cdot A\text{prev}))/20$ wherein A is the estimated airlight for a current frame, and Aprev is a weighted airlight value that is updated each frame to value A, and wherein the input image is a frame of the video, and wherein the estimating step includes the step of reducing each of said pixels to a minimum value of the one or more color channels, thus resulting in a two-dimensional image;

wherein the estimating step further includes the steps of moving a window of a predetermined number of pixels across the 2D image pixel-by-pixel; and replacing each pixel with the minimum value found in said window of a predetermined number of pixels;

calculating, by the processor, a transmission map for one or more color channels of the brightness-corrected input image, wherein the step of calculating the transmission map is performed according to equation:

$$\tilde{t}^c = 1 - \frac{w \cdot I^c}{A^c}$$

wherein w is a transmission map adjustment parameter that controls an amount of haze reduction, I is the input image, A is the airlight, and the superscript c denotes the transmission map calculations are conducted channel-by-channel;

refining, by the processor, the transmission map for each said one or more color channels, wherein the step of refining the transmission map for each said one or more color channels is performed using a mean filter; and providing, by the processor, a haze-reduced image to the memory device, wherein the step of providing, by the processor, a haze-reduced image, is performed according to equation:

$$J^c = \frac{I^c - A^c}{\max(t^c, t_0)} + A^c$$

wherein J is the haze-reduced image, I is the brightness-corrected input image, A is the estimated airlight, t is a refined transmission map, $t_0$ is a transmission map minimum and superscript c denotes the transmission map calculations are conducted channel-by-channel.

* * * * *